2,879,255

N-DIALKYLAMINOALKYL ACRYLAMIDE AND METHACRYLAMIDE MODIFIED POLYACRYLONITRILES AND PROCESS FOR PREPARING SAME

Harry W. Coover, Jr., Kingsport, Tenn., assignor to Eastman Kodak Company, Rochester, N.Y., a corporation of New Jersey No Drawing. Application August 5, 1954
Serial No. 448,151

7 Claims. (Cl. 260—45.5)

This invention relates to modified polyacrylonitriles and to a process for their preparation.

Polyacrylonitrile is known to have many valuable properties which makes it unusually suitable for the preparation of fibers and films such as good strength and toughness, softening and sticking temperatures of about 230° to 250° C., high alkali resistance, low shrinkage at elevated temperatures, etc. However, polyacrylonitrile has the serious defect of poor affinity for commercially available dyes. Various means have been employed to improve the dyeability of polyacrylonitrile, but the result has usually been that while some improvement in dyeing was obtained, other valuable physical properties of polyacrylonitrile had been sacrificed in the process. For example, improved dye affinity has resulted from interpolymerizing acrylonitrile with certain basic monomers whose polymers are known to be highly receptive to acid dyes such as acrylic amides; however, such interpolymers have only a limited use because they generally show softening points considerably lower than the unmodified polyacrylonitriles, as well as degraded values for other properties of unmodified polyacrylonitriles. Thus, W. M. Thomas et al. in U. S. Patent 2,595,907, dated May 6, 1952, shows copolymers of from 85 to 99.5% by weight of acrylonitrile and from 15 to 0.5% by weight of N-(dialkylaminoalkyl) acrylamides which flow at temperatures of from 130° C. to 200° C. It has been found with copolymers of this kind that when the quantity of the amide compound approaches close to or exceeds 5% by weight of the copolymer a pronounced lowering of the softening point occurs, the trend becoming more pronounced until at about 15% content of amide the softening point of the copolymer is too low for most any fiber-making purposes. Fibers prepared from the above kind of copolymers have also been found to be relatively weaker, both wet and dry, to have undesirably higher shrinkage in boiling water after spinning and drafting, to be less resistant to alkaline soaps and scours, etc. than fibers prepared from the unmodified polyacrylonitriles.

I have now found that when acrylonitrile is copolymerized in the presence of certain minor proportions of preformed "live" N-(dialkylaminoalkyl) acrylamide or methacrylamide polymers i.e. preformed polymers which have not been separated from their polymerization reaction mixture and still retain active positions to which the grafting monomer can attach itself chemically and polymerize, the so-called "graft" polymer products obtained show improved dyeability and moisture absorption without the sacrifice in any marked degree of the strength, high sticking temperatures, good alkali resistance and low shrinkage at elevated temperatures which is characteristic of shaped articles such as fibers and films of polyacrylonitrile. In contrast to copolymers of the same percentage or equivalent content of acrylonitrile with the above-mentioned kind of amides, I have found further that the fibers prepared from the graft polymers of my invention have softening or sticking temperatures considerably higher, and greater wet or dry strength, than the analogous copolymer fibers. Furthermore, my graft polymer fibers resist shrinkage in boiling water after spinning and drafting showing not more than about 5–10% shrinkage, whereas the copolymer fibers prepared in the same manner and containing equivalent acrylonitrile and amide contents exhibited very high shrinkage in the order of 30% or more, in boiling water. The graft polymer fibers of my invention are also resistant to degradation by alkaline soaps and scours, whereas the copolymer fibers are easily discolored and degraded in the presence of such alkaline mediums. Furthermore, my graft polymer fibers are much more resistant than the copolymer fibers to attack by organic and dry cleaning solvents. These differences are of considerable importance particularly where the fibers are intended for textile uses.

It is, accordingly, an object of the invention to provide a new class of modified polyacrylonitriles. Another object is to provide a process for preparing these new polymers. Still another object is to provide improved fibers having excellent physical properties, good affinity for organic dyes and high resistance to chemical change. A further object is to provide homogeneous solutions of the new class of polymers in organic solvents. Other objects will become apparent from the following description and examples.

In accordance with the invention, I prepare my new graft polymers by subjecting to polymerizing conditions a dispersion or solution of from 60 to 95 parts by weight of acrylonitrile or a mixture of acrylonitrile and at least one other monoethylenically unsaturated, polymerizable monomer wherein the acrylonitrile is present in an amount not less than 90%, based on the total weight of monomers in the mixture, in the presence of from 40 to 5 parts by weight of either a "live" modifying preformed homopolymer of an N-dialkylaminoalkyl acrylamide or methacrylamide compound having the general formula:

I

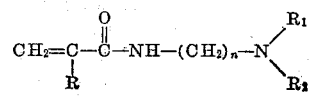

wherein $n$ represents a positive integer of from 1 to 4 and the whole group —$(CH_2)_n$— represents divalent methylene, or ethylene, propylene or butylene groups, R represents an atom of hydrogen or a methyl group and each $R_1$ and $R_2$ represent the same or different alkyl groups containing from 1 to 4 carbon atoms, or in the presence of a copolymer of an amide as above defined with a different monomer in the proportions of not less than 70% by weight of the amide compound, the remainder being the other monomer, until from about 70% to substantially 100% of the acrylonitrile or mixture thereof has polymerized to give the graft polymers of the invention. Amide compounds represented by the above general formula include N-dimethylaminomethyl acrylamide, N-dimethylaminoethyl acrylamide, N-dimethylaminopropyl acrylamide, N-dimethylaminobutyl acrylamide, N-diethylaminomethyl acrylamide, N-diethylaminopropyl acrylamide, N-dipropylaminoethyl acrylamide, N-dibutylaminopropyl acrylamide, N-methyl-N-ethylaminopropyl acrylamide, etc. and the corresponding methacrylamides. The N-dialkylaminopropyl acrylamides and methacrylamides are preferred.

Suitable monoethylenically unsaturated, polymerizable monomers for copolymerizing with the acrylonitrile include vinyl carboxylates wherein the carboxylate group is the radical of a saturated monobasic fatty acid preferably one containing from 1 to 4 carbon atoms such as vinyl acetate, vinyl propionate, vinyl butyrate, vinyl benzoate, etc. acrylic esters such as methyl, ethyl, propyl, butyl acrylates and methacrylates, acrylic amides such as acrylamide, methacrylamide, N-alkyl and N,N-dialkyl acrylamides and methacrylamides wherein the alkyl group in each instance contains from 1 to 4 carbon atoms, etc., vinyl halides such as vinyl chloride, vinyl fluoride, etc., vinylidene halides such as vinylidene chloride, vinylidene fluoride, etc., the mono- and di-alkyl esters of $\alpha,\beta$-ethylenically unsaturated dibasic acids such as the alkyl esters of fumaric, maleic, itaconic, citraconic, etc. acids wherein the alkyl group in each instance contains from 1 to 4 carbon atoms. Suitable monomers for forming the modifying preformed "live" amide copolymers of the invention include the above defined vinyl carboxylates and acrylamides and methacrylamides, acrylic acid, acrylonitrile, etc. as well as mixtures of the amides coming within the above structural formula. Since the modifying preformed "live" amide polymer is employed without separation from its original polymerization reaction mixture, it will be understood that where the conversion of the monomer or monomers to the polymer is carried out to less than 100%, the remaining monomer or monomers will generally function similar to the other monoethylenically unsaturated, polymerizable compounds and copolymerize with the acrylonitrile in the graft step of the process; however, the preferred procedure is to substantially completely homopolymerize or copolymerize the amide or mixture thereof before addition of the acrylonitrile. An alternate but less preferable method for preparing generally similar graft polymers is to employ a "reverse" process, i.e. wherein from 60 to 95 parts by weight of acrylonitrile or a mixture thereof containing at least 90% of acrylonitrile, as previously specified, is first polymerized until from 70% to 100% of the acrylonitrile or mixture has been converted to acrylonitrile polymer, and then without separating the formed polymer from its polymerization reaction mixture, adding to the reaction mixture from 40 to 5 parts by weight of the amide selected from those coming within the above structural formula or mixture thereof containing at least 70% of the amide, as previously specified, and continuing the polymerization until from 70% to substantially 100% of the added acrylonitrile or mixture thereof has polymerized. The graft polymers of the invention prepared as above described contain the components in combination in approximately the same proportions as such components were originally present in the polymerization reaction mixtures. Thus, the graft polymers of the invention have an overall acrylonitrile content between the limits of 54 to 96.5% by weight of combined acrylonitrile. In these composition ranges, no appreciable change in the desirable physical and chemical properties of the graft polymers of the invention are encountered.

Advantageously, the polymerizations are carried out in aqueous medium, although other reaction media such as organic solvents can be employed. The term "dispersion" herein is intended to include both true solutions and emulsions in aqueous or non-aqueous media. For example, it is possible to use organic solvents such as acetonitrile, N,N-dimethyl formamide, N,N-dimethyl acetamide, gamma-butyrolactone, aromatic hydrocarbons such as benzene, toluene, etc., liquid alkanes such as n-heptane, etc., aliphatic ethers, acetone, and the like. Mixtures of water-soluble solvents with water can also be used. The polymerizations can be accelerated by heat, by actinic light such as ultraviolet light and by the use of well known polymerization catalysts such as the peroxides e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc., hydrogen peroxide, perborates e. g. alkali metal perborates such as sodium and potassium perborates, persulfates e.g. alkali metal persulfates such as sodium and potassium persulfates, ammonium persulfate, etc. Other catalysts such as the ketazines, azines, $\alpha,\alpha'$- azo-di-isobutyronitrile, etc. Mixtures of catalysts can be employed. The quantity of catalyst used can be varied from about 0.001 to 2% or more, based on the weight of monomers to be polymerized. All of the required catalyst can be added in the first step of polymerization wherein the modifying preformed "live" polymer is formed there being sufficient left for the following graft step of polymerization, but preferably a portion of catalyst is added in each of the two steps of polymerization.

The temperature at which the process of my invention can be carried out can vary from ordinary room temperature to the reflux temperature of the reaction mixture i.e. from about 20° to 100° or more. However, a temperature of from 30° to 75° C. is preferred. Normal atmospheric pressures are preferred, but the reactions can also be carried out at pressures substantially above or below normal atmospheric pressures.

Advantageously, an emulsifying agent can be added in amount of about from 1 to 5%, based on the weight of the reactants, to ensure uniform distribution of the reactants in the reaction medium. Typical emulsifying agents for this purpose include the alkali metal salts of certain alkyl acid sulfates e.g. sodium lauryl sulfate, alkali metal salts of aromatic acids e.g. sodium isobutylnaphthalene sulfonate, alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers e.g. aryloxy polyalkylene ether sulfonates such as Triton 720, etc.

The polymerizations can be carried out advantageously in the presence of chain regulators such as hexyl, cetyl, lauryl, dodecyl, myristyl mercaptans, etc. which impart improved solubility properties to the resulting graft polymer compositions. If desired, activating agents such as alkali metal sulfites, e.g. sodium, potassium, etc. sulfites, bisulfites and metabisulfites can be added to reduce the time and temperature required for polymerization to be effected. The amounts employed of the chain regulators and activators do not exceed about 1 or 2%, based on the total weight of the reactants.

The polymerizations can also be carried out in a continuous manner, especially in the second or graft step of polymerization. The continuous polymerizations fall into two main groups (1) those which are used in equipment which permits the continuous addition of reactants and the continuous removal of the product (continuous process) and (2) those which are used in batch reactions wherein one or more of the reactants is added continuously during the course of the polymerization, but from which no material is removed during the reaction (continuous batch process). The ingredients can be added to the reaction vessel in various combinations or separately as desired.

The following examples will serve to illustrate further the manner whereby I practice my invention.

*Example 1*

One g. of N-dimethylaminopropyl acrylamide was dissolved in 70 cc. of water containing 1 cc. of Tergitol No. 4 (sodium sulfate derivative of 7-ethyl-2-methylundecanol-4), 0.05 g. of ammonium persulfate and 0.05 g. of sodium metabisulfite. The solution was tumbled in a crown cap bottle for 20 hours in a water bath at 35° C. It formed a stable emulsion. The emulsion obtained was cooled to room temperature and 9 g. of acrylonitrile were added along with 0.1 g. of ammonium persulfate, 0.1 g. of sodium metabisulfite and 0.7 g. of 85% phosphoric acid. Polymerization was completed by tumbling at 35° C. for 8 hours. The resulting graft polymer was isolated by coagulation with aqueous saturated sodium chloride solution, filtered, washed and dried. Analysis showed that the polymer contained 9.5% by weight of the amide compound and 90.5% by weight of acrylonitrile. It was soluble only in polyacrylonitrile solvents such as N,N-dimethyl formamide and N,N-dimethyl acetamide. Fibers prepared from this polymer had a softening point essentially the same as polyacrylonitrile i.e. about 240°–250° C. and showed good affinity for wool, acetate, direct and vat dyes.

In place of the N-dimethylaminopropyl acrylamide in the above example, there can be substituted a like amount of any other of the N-dialkylaminoalkyl acrylamides mentioned as being suitable, for example, N-dimethylaminomethyl acrylamide to give the corresponding graft polymer containing about 10% by weight of the said amide and about 90% by weight of acrylonitrile, N-dimethylaminoethyl acrylamide to give the corresponding graft polymer containing about 10% by weight of the said amide and about 90% by weight of acrylonitrile, and N-diemethylaminobutyl acrylamide to give the corresponding graft polymer containing about 10% by weight of the said amide and about 90% by weight of acrylonitrile. All of these latter graft polymers have generally similar physical and chemical properties and utility as the graft polymer described in the above example.

*Example 2*

Two g. of N-diethylaminopropyl methacrylamide were dissolved in 70 cc. of water containing 1 cc. of Tergitol No. 4, 0.08 g. of ammonium persulfate and 0.04 g. of sodium metabisulfite. The solution was tumbled 16 hours in a water bath at 35° C. The emulsion obtained was cooled to room temperature and 8 g. of acrylonitrile were added along with 0.1 g. of ammonium persulfate, 0.1 g. of sodium metabisulfite and 0.7 g. of 85% phosphoric acid. The polymerization was completed by tumbling the mixture at 35° C. for 8 hours. The resulting graft polymer was isolated by coagulation with an aqueous saturated sodium chloride solution, filtered, washed with water and dried. Analysis showed the polymer to contain 19% by weight of the amide compound and 81% by weight of acrylonitrile. It was soluble only in polyacrylonitrile solvents such as N,N-dimethyl formamide and N,N-dimethyl acetamide. Fibers prepared from this polymer had a softening point substantially above 200° C. and showed excellent affinity for acetate, wool, direct and vat dyes.

In place of the N-diethylaminopropyl methacrylamide in the above example, there can be substituted a like amount of any other of the N-dialkylaminoalkyl methacrylamides mentioned as being suitable, for example, N-diethylaminomethyl methacrylamide to give the corresponding graft polymer containing about 20% by weight of the said amide and about 80% by weight of acrylonitrile, N-diethylaminoethyl methacrylamide to give the corresponding graft polymer containing about 20% by weight of the said amide and about 90% by weight of acrylonitrile, and N-diethylaminobutyl methacrylamide to give the corresponding graft polymer containing about 20% by weight of the said amide and about 80% by weight of acrylonitrile. All of these latter graft polymers have generally similar physical and chemical properties and utility as the graft polymer described in the above example.

*Example 3*

Four g. of N-di-n-butylaminopropyl acrylamide were dissolved in 100 cc. of distilled water containing 2 cc. of Duponol ME (a fatty alcohol sulfate) and 0.1 g. of ammonium persulfate. The solution was tumbled 16 hours in a water bath at 50° C. The emulsion obtained was cooled to room temperature and 6 g. of acrylonitrile were added along with 0.09 g. of ammonium persulfate, 0.09 g. of sodium metabisulfite and 1 g. of 85% phosphoric acid. Polymerization was completed by tumbling at 35° C. for 8 hours. The resulting graft polymer was isolated by coagulation with an aqueous saturated sodium chloride solution, filtered, washed and dried. Analysis showed the polymer to contain 39% by weight of the amide compound and 61% by weight of acrylonitrile. It was soluble in polyacrylonitrile solvents such as N,N-dimethyl formamide and N,N-dimethyl acetamide. Fibers prepared from this polymer had a softening point above 190° C. and showed excellent affinity for acetate, wool, direct and vat dyes.

In place of the N-di-n-butylaminopropyl acrylamide in the above example, there can be substituted a like amount of any of the N-dialkylaminoalkyl acrylamides mentioned as being suitable, for example, N-di-n-butylaminomethyl acrylamide to give the corresponding graft polymer containing about 40% by weight of the said amide and about 60% by weight of acrylonitrile, N-di-n-butylaminoethyl acrylamide to give the corresponding graft polymer containing about 40% by weight of the said amide and about 60% by weight of acrylonitrile, and N-di-n-butylaminobutyl acrylamide to give the corresponding graft polymer containing about 40% by weight of the said amide and about 60% by weight of acrylonitrile. All of these latter graft polymers have generally similar physical and chemical properties and utility as the graft polymer described in the above example.

*Example 4*

Three g. of N-dimethylaminopropyl methacrylamide and 1 g. of vinyl acetate were added to 100 cc. of distilled water containing 2 cc. of Tergitol No. 4, 0.08 g. of ammonium persulfate and 0.07 g. of sodium bisulfite. The emulsion was tumbled 16 hours in a water bath at 35° C. The emulsion of copolymer obtained was cooled to room temperature and 5.9 g. of acrylonitrile and 0.1 g. of vinyl acetate were added along with 0.09 g. of ammonium persulfate, 0.09 g. of sodium bisulfite and 1 g. of 85% phosphoric acid. Polymerization was completed by tumbling at 35° C. for 8 hours. The resulting graft polymer was isolated by coagulation with an aqueous saturated sodium chloride solution, filtered, washed and dried. Analysis showed the polymer to contain 28% by weight of the amide compound, about 10% by weight of vinyl acetate and the remainder of the polymer of acrylonitrile. It was soluble in polyacrylonitrile solvents such as N,N-dimethyl formamide and N,N-dimethyl acetamide. Fibers prepared from this polymer had a softening point above 200° C. and showed excellent affinity for acetate, wool, direct and vat dyes.

In place of the vinyl acetate in the step of forming the amide copolymer in the above example, there can be substituted a like amount of any of the other mentioned vinyl carboxylic esters such as vinyl propionate, vinyl butyrate, vinyl benzoate, acrylonitrile, acrylic acid and any of the other mentioned acrylamides and methacrylamides to give graft polymers having generally similar physical and chemical properties. Also in place of the vinyl acetate in the step of forming the graft polymer, wherein acrylonitrile is copolymerized with a minor portion of vinyl acetate, there can be substituted a like amount of any of the other mentioned vinyl carboxylic esters, acrylic esters, acrylamides, methacrylamides, vinyl halides, vinylidene halides, fumarates, maleates, itaconates and citroconates to give generally similar graft polymers. Fibers prepared from the above combinations of components also show relatively high softening points compared with simple copolymers of the same percentage overall compositions and have excellent affinities for acetate, wool, direct and vat dyes.

*Example 5*

Twenty-three g. of acrylonitrile were added to 230 cc. of distilled water containing 1.5 cc. of Tergitol No. 4, 0.23 g. of ammonium persulfate, 0.23 g. of sodium metabisulfite and 1.35 g. of 85% phosphoric acid. The emulsion was tumbled 8 hours in a water bath at 35° C. The emulsion of polyacrylonitrile obtained was cooled down to room temperature and 8 g. of N-diethylaminopropyl acrylamide and 2 g. of acrylonitrile dissolved in 100 cc. of distilled water containing 1.5 cc. of Tergitol No. 4, 0.1 g. of ammonium persulfate and 0.1 g. of sodium bisulfite were then added. The mixture was then tumbled in a water bath at 35° C. The resulting graft polymer obtained in emulsion form was coagulated by the addition of an aqueous saturated sodium chloride solution, filtered, washed twice with hot water and dried. A yield of 31.5 g. of graft polymer analyzing 23% by weight of the amide and 77% by weight of acrylonitrile was obtained. It was soluble only in polyacrylonitrile solvents such as N,N-dimethyl formamide and N,N-dimethyl acetamide. Fibers prepared from this polymer had a softening point above 200° C. and showed good moisture absorption and excellent affinity for acetate, wool, direct and vat dyes.

In place of the N-diethylaminopropyl acrylamide in the above example, there can be substituted a like amount of any of the other mentioned N-dialkylaminoalkyl acrylamides or corresponding methacrylamides of the invention to give graft polymers having generally similar physical and chemical properties, and especially useful for preparing high quality dyeable fibers. It is alo within the scope of the "reverse" process of the invention to include another monomer with either the acrylonitrile or with the N-dialkylaminoalkyl acrylamide or corresponding methacrylamide, or with both, such monomers being selected from those previously specified as suitable for copolymerizing with the acrylonitrile or with the said amide compounds.

*Example 6*

Two g. of N-dimethylaminoethyl acryamide were dissolved in 70 cc. of water containing 1 cc. of Tergitol No. 4, 0.08 g. of potassium persulfate and 0.04 g. of potassium metabisulfite. The solution was tumbled 16 hours in a water bath at 35° C. The emulsion obtained was cooled to room temperature and 8 g. of acrylonitrile were added along with 0.1 g. of potassium persulfate, 0.1 g. of potassium metabisulfite and 0.7 g. of 85% phosphoric acid. The polymerization was completed by tumbling at 35° C. for 8 hours. The resulting graft polymer was isolated by coagulation with an aqueous saturated sodium chloride solution, filtered, washed and dried. Analysis showed the polymer to contain 19% by weight of the amide compound and 81% by weight of acrylonitrile. It was soluble only in polyacrylonitrile solvents such as N,N-dimethyl formamide and N,N-dimethyl acetamide. Fibers prepared from this polymer had a softening point above 200° C. and showed good moisture absorption and excellent affinity for acetate, wool, direct and vat dyes.

*Example 7*

Four grams of N-dibutylaminopropylacrylamide and 1 gram of N-isopropylacrylamide were added to 100 cc. of distilled water containing 2 grams of sodium lauryl sulfate, 0.03 gram of ammonium persulfate and 0.03 gram of sodium bisulfite. The emulsion was tumbled in a water bath at 40° C. for 12 hours. The emulsion was cooled to room temperature and 9 grams of acrylonitrile, along with 0.1 gram of ammonium persulfate and 0.1 gram of sodium bisulfite, were added. The polymerization was completed by tumbling at 35° C. for 8 hours. The resultant graft polymer was coagulated by heating to 80° C., filtered, washed, and dried. The polymer was readily soluble in such solvents as N,N-dimethyl formamide and N,N-dimethyl acetamide. Fibers prepared from this polymer had a softening point above 200° C. and showed excellent affinity for acetone, direct, wool, and vat dyes.

*Example 8*

2.7 grams of N-diisopropylaminopropylmethacrylamide and .3 gram of methyl acrylate were added to 100 cc. of distilled water containing 2 cc. of Tergitol No. 4, 0.05 g. of ammonium persulfate and 0.05 g. of sodium bisulfite. The emulsion was tumbled 10 hours in a water bath at 40° C. The emulsion of the resultant copolymer was cooled to room temperature and 7 grams of acrylonitrile were added, along with 0.08 gram of ammonium persulfate, 0.08 gram of sodium bisulfite, and 1 gram of 85% phosphoric acid. Polymerization was completed by tumbling at 35° C. for 8 hours. The resultant graft polymer was isolated by heating to 80° C., filtered, washed, and dried. The polymer was readily soluble in polyacrylonitrile solvents such as N,N-dimethyl formamide and N,N-dimethyl acetamide. Fibers prepared from this polymer had a softening point above 200° C. and showed excellent affinity for acetone, wool, direct, and vat dyes.

All of the graft polymers described in the preceding can be made up into solutions or dopes with one or more polyacrylonitrile solvents, with or without added fillers, pigments, dyes, plasticizers, etc., as desired, and the dopes spun to fibers by wet or dry spinning processes, or the dopes can be coated onto smooth surfaces such as film coating wheels to give flexible and tough films and sheet materials which are useful for photographic film supports and other purposes. The graft polymers of the invention can also be used to prepare molding compositions from which can be produced stable shaped articles by compression, extrusion or injection molding processes.

Other solvents which can be used alone or in admixture with one another to prepare solutions or dopes of the graft polymers of the invention include ethylene carbonate, ethylene carbamate, gamma-butyrolactone, N-methyl-2-pyrrolidone, N,N-dimethyl cyanamide, N,N-dimethyl cyanoacetamide, N,N - dimethyl - β - cyanopropionamide, glycolonitrile (formaldehyde cyanohydrin), dimethyl sulfone, tetramethylene sulfone, tetramethylene sulfoxide, N-formyl pyrrolidone, N-formyl morpholine, and the like. However, N,N-dimethyl formamide and N,N-dimethyl acetamide are particularly advantageous solvents.

What I claim is:

1. A resinous graft copolymer of (1) 40–5% by weight of a polymer selected from the group consisting of (a) a homopolymer of a monomer represented by the general formula:

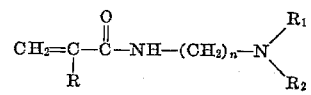

wherein $n$ represents a positive integer of from 1–4, R represents a member selected from the group consisting of a hydrogen atom and a methyl group, and $R_1$ and $R_2$ each represent an alkyl group of from 1–4 carbon atoms, and (b) a copolymer of at least 70% by weight of a monomer represented by the said general formula and not more than 30% by weight of a monomer selected from the group consisting of a vinyl ester of a saturated fatty acid which contains from 2–4 carbon atoms, vinyl benzoate, acrylic acid, acrylonitrile, acrylamide, methacrylamide, an N-alkyl acrylamide, an N,N-dialkyl acrylamide, an N-alkyl methacrylamide and an N,N-dialkyl methacrylamide, wherein the said alkyl group in each instance contains from 1–4 carbon atoms, and (2) 60–95% by weight of monomeric material selected from the group consisting of (a) acrylonitrile and (b) a mixture consisting of at least 90% by weight of acrylonitrile and not more than 10% by weight of a compound selected from the group consisting of a vinyl ester of a saturated fatty acid which contains from 2–4 carbon atoms, vinyl benzoate, acrylic acid, vinyl chloride, vinylidene chloride, acrylamide, methacrylamide, an N-alkyl acrylamide, an N,N-dialkyl acrylamide, an N-alkyl methacrylamide, an N,N-dialkyl methacrylamide, an alkyl acrylate, an alkyl methacrylate, a monoalkyl fumarate, a dialkyl fumarate, a monoalkyl maleate, a dialkyl maleate, a monoalkyl itaconate, a dialkyl itaconate, a monoalkyl citraconate and a dialkyl citraconate, wherein the said alkyl group in each instance contains from 1–4 carbon atoms.

2. A resinous graft copolymer of (1) 40–5% by weight of poly-N-dimethylaminopropyl acrylamide, and (2) 60–95% by weight of monomeric acrylonitrile.

3. A resinous graft copolymer of (1) 40–5% by weight of poly-N-diethylaminopropyl methacrylamide, and (2) 60–95% by weight of monomeric acrylonitrile.

4. A resinous graft copolymer of (1) 40–5% by weight of poly N-di-n-butylaminopropyl acrylamide, and (2) 60–95% by weight of monomeric acrylonitrile.

5. A resinous graft copolymer of (1) 40–5% by weight of poly-N-dimethylaminoethyl acrylamide, and (2) 60–95% by weight of monomeric acrylonitrile.

6. A resinous graft copolymer of (1) 40–5% by weight of a preformed copolymer of N-dimethylaminopropyl methacrylamide in copolymerized form and vinyl acetate wherein the said methacrylamide constitutes at least 70% by weight of the foresaid preformed copolymer, and (2) 60–95% by weight of a monomeric mixture consisting of acrylonitrile and vinyl acetate wherein the said acrylonitrile constitutes at least 90% by weight of the said monomeric mixture.

7. A process for preparing a resinous graft copolymer which comprises heating a polymerization reaction mixture comprising water as the reaction medium, a peroxide polymerization catalyst and (1) 40–5% by weight of a polymer selected from the group consisting of (a) a homopolymer of a monomer represented by the general formula:

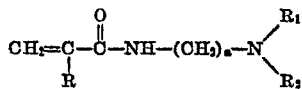

wherein $n$ represents a positive integer from 1–4, R represents a member selected from the group consisting of a hydrogen atom and a methyl group, and $R_1$ and $R_2$ each represent an alkyl group of from 1–4 carbon atoms, and (b) a copolymer of at least 70% by weight of a monomer represented by the said general formula and not more than 30% by weight of a monomer selected from the group consisting of a vinyl ester of a saturated fatty acid which contains from 2–4 carbon atoms, vinyl benzoate, acrylic acid, acrylonitrile, acrylamide, methacrylamide, an N-alkyl acrylamide, an N,N-dialkyl acrylamide, an N-alkyl methacrylamide and an N,N-dialkyl methacrylamide, wherein the said alkyl group in each instance contains from 1–4 carbon atoms, and (2) 60–95% by weight of monomeric material selected from the group consisting of (a) acrylonitrile and (b) a mixture consisting of at least 90% by weight of acrylonitrile and not more than 10% by weight of a compound selected from the group consisting of a vinyl ester of a saturated fatty acid which contains from 2–4 carbon atoms, vinyl benzoate, acrylic acid, vinyl chloride, vinylidene chloride, acrylamide, methacrylamide, an N-alkyl acrylamide, an N,N-dialkyl acrylamide, an N-alkyl methacrylamide, an N,N-dialkyl methacrylamide, an alkyl acrylate, an alkyl methacrylate, a monoalkyl fumarate, a dialkyl fumarate, a monoalkyl maleate, a dialkyl maleate, a monoalkyl itaconate, a dialkyl itaconate, a monoalkyl citraconate and a dialkyl citraconate, wherein the said alkyl group in each instance contains from 1–4 carbon atoms, until the said monomeric material has polymerized to form the said resinous graft copolymer.

References Cited in the file of this patent
UNITED STATES PATENTS

| | | |
|---|---|---|
| 2,311,548 | Jacobson et al. | Feb. 16, 1943 |
| 2,595,907 | Thomas et al. | May 6, 1952 |
| 2,649,434 | Coover et al. | Aug. 18, 1953 |
| 2,657,191 | Coover et al. | Oct. 27, 1953 |
| 2,735,830 | Coover | Feb. 21, 1956 |
| 2,735,831 | Coover | Feb. 21, 1956 |